Feb. 27, 1968  W. WINGEN  3,370,645
AIR CONDITIONING APPARATUS
Filed Feb. 14, 1966
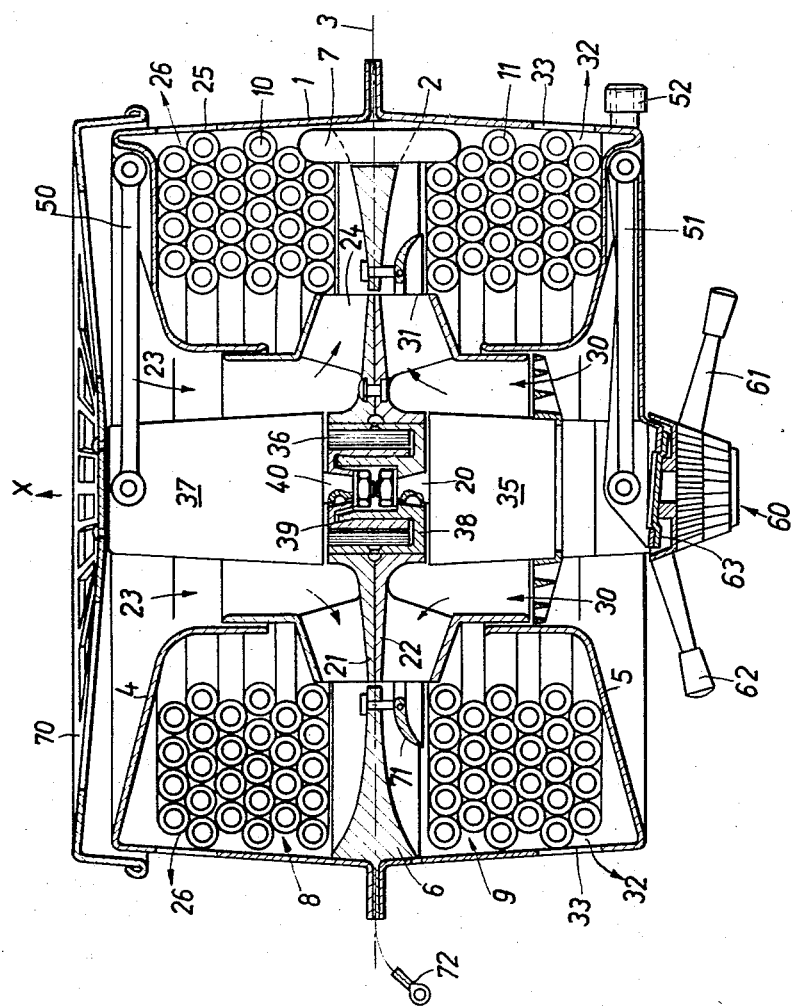

United States Patent Office 3,370,645
Patented Feb. 27, 1968

3,370,645
AIR CONDITIONING APPARATUS
Wilhelm Wingen, Grosshelfendorf, uber Munich, Germany, assignor to Firma Georg Fritzmeier KG., Grosshelfendorf, uber Munich, Germany
Filed Feb. 14, 1966, Ser. No. 527,131
Claims priority, application Germany, Feb. 16, 1965, F 45,263
12 Claims. (Cl. 165—63)

ABSTRACT OF THE DISCLOSURE

Air conditioning apparatus includes housings mounted on opposite sides of a wall of an enclosure, and a heat exchange coil mounted in each housing. The coils are in communication to form a circulation system for a cooling fluid. A blower unit including two opposed, axially intaking, radially discharging fans is mounted within the housings for movement to a mid-position in which the outer fan circulates outside air over the outer coil to cool fluid in that coil, and in which the inner fan circulates air inside the enclosure over the inner coil to cool the inside air. The blower unit is movable to a position on one side of the mid-position, in which the outer fan blows fresh air into the enclosure, and to another position on the other side of the mid-position, in which the inner fan draws stale air from the enclosure. The apparatus can be used as a heating unit by actuating a heating device adjacent the inner coils, and discontinuing flow of cooling fluid.

The invention relates to air conditioning units, and more particularly, to air conditioning units for use in drivers' cabs of agricultural machines, building machines or the like.

For the air conditioning of vehicle cabs of the mentioned type, air conditioning units such as have been provided for offices, workrooms and private homes are too spacious and bulky, and have a connected load that is too high to be provided by the light installations of vehicles. There have already been known air conditioning units for use in vehicles which are driven directly through the engine by means of a V belt. Such units, as well, as relatively big and require a considerably involved installation with the result that they are likewise unsuitable for use in the present case.

It is an object of the invention to provide an extremely compact and self-contained air conditioning unit that requires a minimum of space and may conveniently be housed in the relatively narrow drivers' cabs of agricultural machines or building machines without being in the way of the driver, and that ensures satisfactory air conditioning of the cab irrespective of its compactness and small dimensioning.

This problem has been solved by arranging at the cabin roof, above and below thereof, concentric spiral coils which are so connected to provide a closed cycle for a cooling system employing a cooling fluid that is cooled with outside air above and serves at the same time to regulate the inside air temperature to a convenient degree, and further by providing two fan wheels on a drive shaft which is central to the spiral coils, wherein the directions of intake of air is to the respective fans are axially opposed to each other, said fan wheels being axially slidable as a unit together with the drive shaft, relative to the cabin roof, in such a manner that upon occupying their mid-position each fan exclusively blows air towards the upper or lower spiral coils, respectively, and depending upon the respective upward or downward position of the unit one of the fan wheels blows both in upward and in downward direction.

Applying the simple concept of axially sliding two oppositely intaking and radially blowing fans, air conditioning units according to the invention permit not only cooling of the cab, i.e. to blow the air into the cab in a continuous cycle around the cooling or refrigeration coils, but also to draw stale air from the cab, or to blow into it fresh air, and to establish into the cab a high pressure condition to a certain extent, thereby preventing the entry of dust from outside through joints and crevices. Furthermore, a maximum in compactness is obtained in conjunction with additional advantages in construction, manufacture and performance; all that is necessary is to arrange the essential parts centrally and symmetrically to the drive axle and to design the parts of the unit, i.e. those parts arranged above and below the cabin roof, in identical manner to each other.

Thus the spiral coils may conveniently be housed in annular closed housings that enclose the fan wheels, and may be separated by a tapered collar extending in the plane of the roof and onto the pressure side of the fan wheels, thereby preventing mixing of both air streams when the fan wheels occupy their mid-position.

The annular housings are preferably covered at the suction sides of the fan wheels, in outward direction, and each housing has an annular flange that is centrally drawn inwardly and overlaps the central intake connection of the associated fan wheel at least over the length of the sliding path.

The slidability of the drive shaft in conjunction with the fan wheels may advantageously be obtained in such a manner that the drive shaft is indirectly pivoted above and below to the annular housings that are fixedly connected to the cabin roof, by means of radially outwardly extending arms. Sliding may then be effected simply with the help of a lever via an inclined disk guide that is concentric to the drive shaft.

A particularly compact air conditioning unit is obtained by arranging the drive motor within the lower annular housing.

The drive motor is preferably a hydraulic-type or air-type motor, the hydraulic means of which is taken from the hydraulic system or provided by the exhaust gases of the vehicle engine that are supplied or directed, respectively, through the arms which, in this case, are designed as hollow bodies.

In order to avoid rapid clogging and contamination of the unit, the outwardly arranged annular housing is covered with a filter disk which is capable of rotation with the drive shaft and which, through centrifugal force, centrifuges dust particles from the air drawn into the unit.

Preferably, a compressor is provided on the drive axle, exterior of the cab, in the outer annular housing, which compressor is driven by the drive motor for the fan wheels and serves to compress the cooling or refrigeration means, the arrangement being conveniently such that this compressor is adapted for electrical disconnection from the drive motor, in case the cab is to be heated.

The problem is solved more readily if water in gravity circulation is provided as the cooling fluid. When such is the case, the pipes arranged on the cabin roof are then enclosed with a water moistened felt jacket or the like, and are cooled by vaporization of the water contained in the felt by the air stream of the fan wheels.

The air conditioning unit according to the invention may conveniently be used for heating the cab, as well. For this purpose there is suitably provided an annular vane below the tapered collar and in the air stream returning into the cab interior, via the cooling coils, wherein the vane is somewhat wing-shaped in cross section and adapted to be heated by means of resistance heating.

Obviously, in such a case the circulation of coolant has to be discontinued.

Another modification for heating the cab includes heating coils provided between the spiral coils below the cabin roof. The heating coils may be adapted for connection with the cooling water system of the vehicle and filled with liquid circulating from the cooling system of the vehicle engine.

The invention will be illustrated hereinafter with reference to a schematic drawing showing one embodiment of the invention.

The figure is a longitudinal section of an air conditioning unit according to the invention.

1 and 2 denote two annular housings that are arranged on the top and the underside, respectively, of the cabin roof which is indicated by dash-dotted line 3. These housings are covered at the outside of the cab or the inside, respectively, by means of inwardly drawn flanges 4 and 5, and they are separated from each other in the plane of the cabin roof by a tapered collar 6. Within the so defined annular space of the annular housings there are provided packages 8 and 9 of concentric spiral coils 10 (condenser) and 11 (evaporator), the arrangement being such that the two packages are connected to form a closed circulation system through a flow connection 7 for the coolant stream in downward direction, and through another connection (not shown) for the reverse direction of flow.

In the interior of the two housings there are seated on one common drive shaft 20 two fan wheels 21 and 22 the axial intake connections of which are overlapped to a certain extent by the axially extending portion of the drawn-in parts 4 and 5 of the housing. Fan wheel 21 draws in outside air as shown by directional arrow 23, and blows through opening 24 into annular housing 1 in order to cool the fluid in pipes 10; the air leaves annular housing 1 in the direction of arrows 26, via openings 25, after circulating around the pipes.

Fan wheel 22 draws air from the interior of the cab as shown by directional arrows 30; the air is blown through radial openings 31 into the lower annular housing 2 wherefrom the conditioned air flows back into the cab, from opening 33, after circulating around pipes 11, as shown by directional arrows 32.

A hydraulic-type or air-type motor 35 is seated on shaft 20 which is supplied with drive means in a manner to be described hereinafter and which is adapted to be connected to a compressor 37 through an electromagnetic clutch 36 housed in the interior of the fan wheels. The compressor is provided for the liquefaction of the cooling fluid. One of the clutch halves, namely 38, is fixedly connected to shaft 20 of the drive motor, whereas the other one, namely 39, is fixedly connected to shaft 40 of the compressor.

The blower unit consisting of drive motor 35, fan wheels 21 and 22, and compressor 37 is adapted to perform an axial sliding movement, relative to annular housings 1 and 2. To this end, drive motor 35 and compressor 37 are hinged to the annular housings by means of arms 50 and 51. These arms are in the form of pipes. Arms 51 serve to supply and withdraw the motor drive means via connections 52 whereas arms 50 provide the flow connections between compressor and pipes 10 and 11 for the coolant.

The motor 35 is switched on through control-device 60 arranged above the driver's head in the cab and actuates, for example, a hydraulic switch when lever 61 is operated. The axial sliding of the blower unit may be effected through the same control-device. For this purpose there is provided a lever 62 actuating an inclined disk guide 63 of very small angle. Turning of lever 62 changes the angle of inclination of the disk guide relative to arms 50 and 51. Such an adjustment shifts the blower unit in a direction axially to the drive motor 35.

In the mid-position of the air conditioning unit, such as is shown in the drawing, the lower fan wheel serves to direct the refrigeration obtained through vaporization into the cabin space, whereas the upper fan wheel serves to conduct the heat resulting from liquefaction to the outside air. Mixing of the radial air streams of both fan wheels is prevented by the tapered collar 6 which extends onto the pressure connection of the fan wheels. If the blower unit is moved in upward direction according to arrow X through pivotally moving lever 62, the air from the cabin space is partly blown via the tapered collar and exhausted to the outside air together with the fresh air of fan wheel 21, via annular housing 1, whereby venting of the cab is achieved. If, on the other hand, there is a sliding movement in downward direction according to arrow Y, fresh air is forced downwards into the cabin space via tapered collar 6. This provides ready ventilation.

The water of condensation precipitating on the evaporator pipes 11 is collected in the lower annular housing forming a collector sleeve, and carried away into the open through a drain pipe which is arranged conveniently between the two hydraulic or air connections 52.

In order to avoid contamination resulting from heavy atmospheric pollution the upper annular housing 1 is covered with a rotary filter 70, which is fixed to the compressor axle and adapted to rotate therewith, whereby dust particles in the air are forced in outward direction through resulting centrifugal forces.

With the help of the present air-conditioning unit the cab may also readily be heated at low outside temperatures. To this end, there is mounted below the tapered collar 6 an air stream baffle element 71 which a resistance heater supplied with current via feed line 72. The air stream baffle element suitably has the cross sectional shape of an airfoil wing, thereby providing the advantage of a large heating surface in conjunction with an intensive heating of the air stream. A thermostat is conveniently arranged in control device 60 automatically maintaining the desired predetermined cab temperature, in the heat-switched-on position. The room temperature is adjusted through a so-called ring-shaped thermometer which is also visibly mounted in the control device and connects the cable feed line to the heating wire through suitable shunting measures. It is understood that in consequence of switching the heater in the "on" position, compressor 37 is is automatically switched off by means of the electromagnetic clutch 36. A small indicator light is provided between the ring-shaped thermometer and shows the driver whether or not the heating position is switched on.

What is claimed is:

1. Air conditioning apparatus, comprising
a casing having opposing housing portions,
means defining a first intake opening and a first discharge opening in one housing portion,
means defining a second intake opening and a second discharge opening in the opposite housing portion,
a first heat exchange conduit mounted in the one housing portion and a second heat exchange conduit mounted in the opposite housing portion,
means communicating the first and second heat exchange conduits with one another,
first and second air circulating means disposed within the casing,
means movably mounting the first and second air circulating means for movement to
a first position in which the first air circulating means passes air into the casing through the first intake opening, in heat exchange relationship with the first heat exchange conduit, and out of the casing through the first discharge opening, and in which the second air circulating means passes air into the casing through the second intake opening, in heat exchange relationship with the second heat exchange conduit, and out of the casing through the second discharge opening, a position on one side of the first position, in which the first air circulating means passes air into the casing through the first intake opening and passes at least a portion of the air out of the casing through the second discharge opening, and a position on the other side of the first position, in which the second air circulating means passes air into the casing through the second intake opening and passes at least a portion of the air out of the casing through the first discharge opening, and means for selectively moving the first and second air circulating means to each position.

2. Air conditioning apparatus, comprising means defining a casing having a longitudinal axis and first and second opposing annular housings disposed on opposite sides of a wall of an enclosure, each housing having an axially directed inlet opening and radially directed outlet openings, a blower unit including first fan means disposed in the first housing, for drawing air axially through the inlet opening of the first housing and discharging in a radial direction, second fan means disposed in the second housing, for drawing air axially through the inlet opening of the second housing and discharging in a radial direction, and a motor having a drive shaft, the first and second fan means being connected to the drive shaft, a first concentric spiral coil mounted in the first housing and a second concentric spiral coil mounted in the second housing, means communicating the coils with one another to form a closed circulation system for a cooling fluid, a collar separating the housings and extending radially inwardly toward the fan means, mounting means mounting the blower unit for axial movement to a mid-position in which the first fan means is disposed on one side of the collar and discharges onto the first coil, and in which the second fan means is disposed on the opposite side of the collar and discharges onto the second coil, a position on one side of the mid-position in which the first fan means discharges onto both coils, and a position on the other side of the mid-position in which the second fan means discharges onto both coils, and moving means for selectively moving the blower unit to each position.

3. The air conditioning apparatus of claim 2, wherein each of the first and second fan means includes a fan wheel, each fan wheel having an axially extending intake connection and a radially extending outlet connection.

4. The air conditioning apparatus of claim 3, the mounting means including arms pivotally connecting the blower unit to the housings, and the moving means including inclined disk guide means for axially shifting the blower unit, and lever means for turning the disk guide means to axially shift the blower unit.

5. The air conditioning apparatus of claim 3, each housing including a flange covering the respective coil and having an inner peripheral portion overlapping the intake connection of the respective fan wheel a distance corresponding to the distance the blower unit is movable.

6. The air conditioning apparatus of claim 3, the first coil forming an evaporator coil and the second coil forming a condenser coil, the blower unit including a compressor and connecting means operatively connecting the motor to the compressor, the means communicating the coils with one another including conduit means communicating the compressor with the evaporator coil and condenser coil.

7. The air conditioning apparatus of claim 6, the mounting means including first arms pivotally connecting the compressor to the second housing, the arms being hollow and forming a portion of said conduit means, and second arms pivotally connecting the motor to the first housing, the moving means including inclined disk guide means for axially shifting the blower unit, and lever means for turning the disk guide means to axially shift the blower unit.

8. The air conditioning apparatus of claim 7, wherein the motor is a fluid motor and the second arms are hollow members, the air conditioning apparatus including means communicating the motor with a source of fluid power through the hollow members.

9. The air conditioning apparatus of claim 6, including an annular airfoil-shaped heating element disposed on one side of the collar in front of the outlet connection of the first fan wheel, and means for electrically heating the heating element, the connecting means including electrically operable clutch means for disconnecting the compressor from the motor.

10. The air conditioning apparatus of claim 3, including an annular airfoil-shaped heating element disposed on one side of the collar in front of the outlet connection of the first fan wheel, and means for electrically heating the heating element.

11. The air conditioning apparatus of claim 3, including filter disk means mounted over the inlet of the second housing for centrifuging solid particles from air, and means operatively connecting the filter disk means for rotation with the drive shaft.

12. Air conditioning apparatus, comprising a casing having a longitudinal axis and air inlets and outlets and adapted to be inserted through a wall of an enclosure with a first part of the casing disposed inside the enclosure and a second part disposed outside the closure, a collar separating the two parts of the casing, a first concentric spiral coil mounted in the first part of the casing and a second concentric spiral coil mounted in the second part of the casing, means communicating the coils with one another to form a closed circulation system for a cooling fluid, a blower unit including first fan means for axially drawing air into the first part of the casing, second fan means for axially drawing air into the second part of the casing, and a motor having a drive shaft mounted centrally relative to the coils, the first and second fan means being connected to the drive shaft, means mounting the blower unit for movement to a mid-position in which the first fan means is disposed on one side of the collar and discharges onto the first coil, and in which the second fan means is disposed on the other side of the collar and discharges onto the second coil, a position on one side of the mid-position, in which the first fan means discharges onto both coils, and a position on the other side of the mid-position in which the second fan means discharges onto both coils, and means for selectively moving the blower unit to each position.

References Cited

UNITED STATES PATENTS

| | | | |
|---|---|---|---|
| 1,917,537 | 7/1933 | Melcher | 62—429 X |
| 2,475,841 | 7/1949 | Jones | 62—323 |
| 2,576,549 | 11/1951 | Wagner et al. | 62—259 |
| 2,654,233 | 10/1953 | Shoemaker | 98—94 X |
| 2,474,410 | 6/1949 | Ave | 230—209 X |
| 2,928,261 | 3/1960 | Sampietro | 230—128 X |

EDWARD J. MICHAEL, *Primary Examiner.*

ROBERT A. O'LEARY, *Examiner.*

M. A. ANTONAKAS, *Assistant Examiner.*